United States Patent
Stekelenburg

(10) Patent No.: US 6,727,939 B1
(45) Date of Patent: Apr. 27, 2004

(54) CAMERA WITH AN AUXILIARY CAMERA

(75) Inventor: Michael A. W. Stekelenburg, Breda (NL)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/548,729

(22) Filed: Apr. 13, 2000

(30) Foreign Application Priority Data

Apr. 15, 1999 (EP) .............................................. 99201146

(51) Int. Cl.⁷ ................................................. H04N 7/18
(52) U.S. Cl. ........................................ 348/158; 348/218
(58) Field of Search ......................... 348/158, 373–376, 348/218

(56) References Cited

U.S. PATENT DOCUMENTS

| | | | | |
|---|---|---|---|---|
| 5,434,614 A | * | 7/1995 | Dainty ........................ 348/64 |
| 5,742,335 A | * | 4/1998 | Cannon ....................... 348/135 |
| 5,940,126 A | * | 8/1999 | Kimura ....................... 348/218 |
| 5,974,272 A | * | 10/1999 | Kiesow et al. .............. 396/140 |
| 6,023,288 A | * | 2/2000 | Coombs et al. ............... 348/64 |
| 6,056,449 A | * | 5/2000 | Hart ........................... 396/421 |
| 6,061,182 A | * | 5/2000 | Carmeli et al. ............. 359/629 |

FOREIGN PATENT DOCUMENTS

EP        01062974 A       3/1989       .......... H04N/5/225

* cited by examiner

*Primary Examiner*—Andy Rao
(74) *Attorney, Agent, or Firm*—Joseph S. Tripoli; Francis A. Davenport; Christine Johnson

(57) ABSTRACT

Portable cameras are known, and used to gather news, to cover sport events etc. The cameraman/woman who is recording the scene to be recorded frequently has to walk around during recording. By walking in a forward direction he normally does not encounters problems, but by walking in a backward and/or sideward direction accidents frequently occur. The invention provides a solution for this, by adding an auxiliary camera to the portable camera with a viewing angle in the backward and/or sideward direction.

8 Claims, 1 Drawing Sheet

CAMERA WITH AN AUXILIARY CAMERA

BACKGROUND OF THE INVENTION

The invention relates to a portable television camera as described in the preamble of claim 1.

Portable television cameras are known in the art and are for example used for gathering news, different sport events, and other things.

The cameraman or woman normally carries the portable television camera on his/her shoulder. When recording scenes he normally looks with one eye in the ocular of a viewfinder and with his other eye he sees a part of the surroundings in front of him/her.

During making the recordings he often has to walk in a forward or backward direction. As the cameraman sees part of the surroundings in front of him he normally does not encounters problems in walking in a forward direction. But walking in a backward direction he has to do "blind".

In the past it has frequently happened that a cameraman walked against obstacles or for example fell down from a podium etc.

SUMMARY OF THE INVENTION

It is inter alia an object of the invention to provide a portable television camera, which overcomes the objections of the prior art. To this end a first aspect of the invention provides a portable television camera as claimed in claim 1.

By adding an auxiliary camera to the portable television camera the cameraman is able to view a scene behind and or next to him. That is to say to view the surroundings and can use this information for example when he wants to walk around during recording.

It is to be noticed here that the use of a camera as a rear view mirror to view behind the person is known per se and for example used with trucks.

Further it is to be noticed here that an auxiliary camera also is already used in a studio environment to keep an overview of the surroundings during zooming in very detail.

An embodiment of the invention comprises the features as claimed in claim 2. A further embodiment of the invention comprised features of claim 3.

By displaying the second view (behind and/or next to the camera man) on the view finder of the portable television camera the camera man can, during recording a scene in front of him, "see" what obstacles are behind him and so is able to walk backwards in safety.

An embodiment of the invention comprises the features of claim 4. By mechanically coupling the auxiliary camera flexible to the housing of the portable television camera the cameraman is able to direct the auxiliary camera as he prefers.

BRIEF DESCRIPTION OF THE DRAWING

The invention and additional features, which may be optionally, be used to implement the invention to advantage will be apparent from and elucidated with references to the examples described below, hereinafter and shown in the Figures. Herein shows.

DESCRIPTION OF THE PREFERRED EMBODIMENTS

Figure 1A:
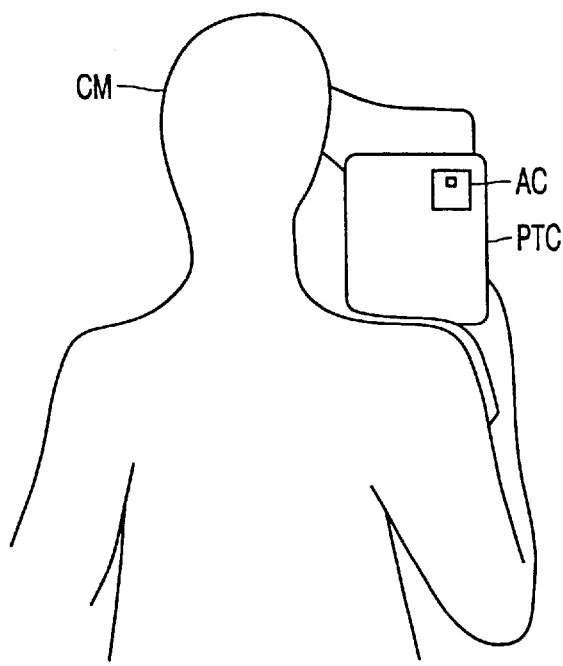
FIG. 1 a rear view and a sight view of a camera man with a portable television camera according to the invention, and FIG. 2 schematically a view finder image of a portable television camera according to the invention.
Figure 1B:
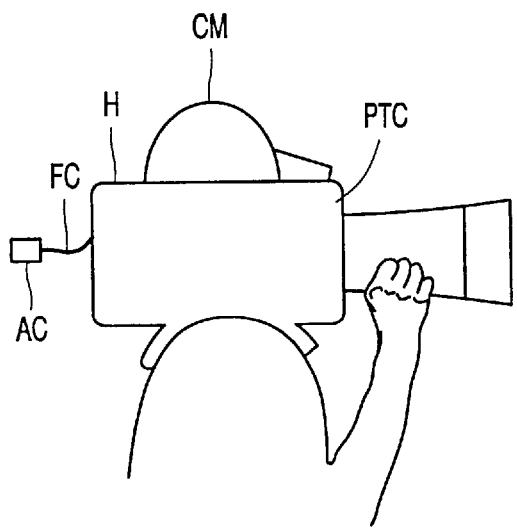

FIG. 1 shows a camera man/woman CM with a portable television camera PC on his shoulder and FIG. 1a shows a rear view with the cameraman and FIG. 1b shows a side view of the cameraman. As can been seen in both FIG. 1a and FIG. 1b the portable television camera comprises an auxiliary camera AC schematically shown in the Figure. As can been seen in the FIG. 1b the auxiliary camera AC is coupled to the housing H of the portable television camera PTC via a flexible mechanical coupling FC which makes it possible for the camera man to direct the auxiliary camera on the part of the surroundings behind and/or next to him he wants to view during the recording of the scene. For example when the cameraman knows beforehand that he has to walk in a backward and left direction he can beforehand amend the viewing direction of the auxiliary camera in that direction.

Figure 2:
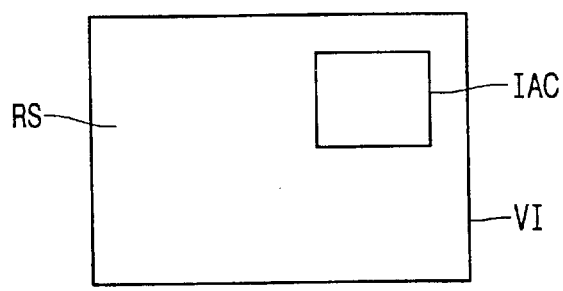

FIG. 2 shows schematically the viewfinder image the cameraman will see during viewing and/or recording the scene. Most of the image he will seen is the scene he wants to record RS. In the right upper corner in this example the image of the auxiliary camera IAC is displayed. In this way the cameraman always knows what's behind and/or next to him. Of course it is also possible that the view finder image is arranged in such a way that the scene to be recorded RS and the image of the auxiliary camera IAC do not overlap but are displayed next to each other or that the image of the auxiliary camera is displayed at an other position in the scene to be recorded or it can be made possible to place the image of the auxiliary camera at a position requested by the camera man. Further it can be made possible that the second scene in the viewfinder can put on or off on command of the cameraman. The image of the auxiliary camera can be compressed with a compression circuit before displaying it on the viewfinder. Such compression circuits are known in the art as picture in picture PIP and integrated circuits are available to use this technique.

The portable television camera described above according to the invention represents only one example, however, it will be appreciated by one skilled in the art that many other variations are possible which fall within the scope of the invention concerned, The auxiliary camera can of course be coupled to the housing of the portable camera on different places. So is it possible that the auxiliary camera is coupled to the top of the camera for example.

What is claimed is:

1. A portable television camera comprising:

a viewfinder responsive to a main image signal from a main image sensor, said main image signal corresponding to a first scene;

an auxiliary camera having a auxiliary image sensor for providing an auxiliary image signal to said viewfinder, said auxiliary image signal corresponding to a second scene.

2. The portable television camera of claim 1 wherein said viewfinder is responsive to both said main image signal from said main image sensor and to said auxiliary image signal from said auxiliary camera.

3. The portable television camera of claim 2 wherein said first scene or said first and said second scenes can be displayed on said viewfinder.

4. The portable camera of claim 3 wherein said first and second scenes are displayed as a picture-in-picture (PIP) on said viewfinder.

5. The portable camera of claim 1 further comprising a compression circuit for compressing said auxiliary image signal from said auxiliary camera.

6. The portable camera of claim 1 wherein said main image sensor is housed within a housing of said camera and wherein said auxiliary camera is external to said housing.

7. The portable camera of claim 6 wherein said auxiliary camera is coupled to said housing via a flexible mechanical coupler.

8. The portable camera of claim 7 wherein said auxiliary camera is capable of being positioned in any direction relative to said housing.

* * * * *